United States Patent
Kuersch et al.

(10) Patent No.: US 7,571,164 B2
(45) Date of Patent: Aug. 4, 2009

(54) SYSTEM AND METHOD FOR DEFERRED DATABASE CONNECTION CONFIGURATION

(75) Inventors: Ralf Kuersch, Sandhausen (DE); Dietmar Theobald, Karlsruhe (DE); Thomas Raupp, Karlsdorf-Neurthard (DE)

(73) Assignee: SAP AG, Walldorf (DE)

( * ) Notice: Subject to any disclaimer, the term of this patent is extended or adjusted under 35 U.S.C. 154(b) by 471 days.

(21) Appl. No.: 10/956,705

(22) Filed: Oct. 1, 2004

(65) Prior Publication Data

US 2006/0074955 A1 Apr. 6, 2006

(51) Int. Cl.
G06F 17/40 (2006.01)
(52) U.S. Cl. .............................. 707/8; 707/9; 707/102; 707/202; 711/162
(58) Field of Classification Search ................ 707/101, 707/8, 9, 102, 202; 705/38; 709/203, 205; 711/162
See application file for complete search history.

(56) References Cited

U.S. PATENT DOCUMENTS

| | | | | |
|---|---|---|---|---|
| 5,369,764 A | * | 11/1994 | Blair | 707/8 |
| 5,737,601 A | * | 4/1998 | Jain et al. | 707/201 |
| 5,806,075 A | * | 9/1998 | Jain et al. | 707/201 |
| 5,842,196 A | * | 11/1998 | Agarwal et al. | 707/2 |
| 5,960,194 A | * | 9/1999 | Choy et al. | 707/102 |
| 5,991,771 A | * | 11/1999 | Falls et al. | 707/202 |
| 6,035,379 A | * | 3/2000 | Raju et al. | 711/162 |
| 6,701,345 B1 | * | 3/2004 | Carley et al. | 709/205 |
| 6,856,993 B1 | * | 2/2005 | Verma et al. | 707/101 |
| 6,912,520 B2 | * | 6/2005 | Hankin et al. | 707/1 |
| 6,980,988 B1 | * | 12/2005 | Demers et al. | 707/8 |
| 7,177,866 B2 | * | 2/2007 | Holenstein et al. | 707/8 |
| 2001/0034701 A1 | * | 10/2001 | Fox et al. | 705/38 |
| 2003/0036919 A1 | * | 2/2003 | Felt et al. | 705/1 |

OTHER PUBLICATIONS

Hal Berenson, Phil Bermstein, Jim Gray, Jim Melton, Eliszabeth O'Neil and Patrick O'Neil. "A critique of ANSI SQL isolation levels", May 2005, ACM Press, vol. 24 Issue 2, pp. 1-10.*

Bernstein, Authur J. et al., "Semantic Conditions For Correctness at Different Isolation Levels", Proceedings of the 16th International Conference on Data Engineering, ISBN: 0-7695-0506-6, Feb. 29-Mar. 3, 2000, pp. 57-66.*

* cited by examiner

*Primary Examiner*—Shahid A Alam
(74) *Attorney, Agent, or Firm*—Schwegman, Lundberg & Woessner, P.A.

(57) ABSTRACT

A system and method for deferred database connection configuration. A database connection handle associated with a physical database connection is assigned to an application. An indication is received from the application to access a specified connection parameter of the physical database connection. A connection handling infrastructure determines whether the specified connection parameter is one of a selected subset of connection parameters. Access to the specified connection parameter is deferred, if the specified connection parameter is one of the selected subset of connection parameters.

26 Claims, 11 Drawing Sheets

SYSTEM AND METHOD FOR DEFERRED DATABASE CONNECTION CONFIGURATION

TECHNICAL FIELD

Embodiments of the invention generally relate to the field of data processing and, more particularly, to a system and method for deferred database connection configuration.

BACKGROUND

Many businesses provide access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). The SOAP protocol refers to any of the SOAP protocols including the one promulgated by the World Wide Consortium (W3C) entitled, "SOAP Version 1.1 Part 1: Messaging Framework and Part 2: Adjuncts," 24 Jun. 2003 (hereinafter, the SOAP protocol). The Secure Socket Layer protocol refers to any of the Secure Socket Layer protocols including, for example, the protocol entitled, "The SSL Protocol Ver. 3.0," Nov. 18, 1996 (the HTTPS protocol).

Presentation logic 142 generates a Graphical User Interface (GUI) using, for example, a markup language such as the Hyper Text Markup Language (HTML). Business logic 144 represents the core of the application, for example, the rules governing the underlying business process (or other functionality) provided by the application. The Java 2 Enterprise Edition Specification v1.3, published on Jul. 27, 2001 (the J2EE specification) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Database interface 146 provides an interface between business logic 144 and database layer 130. Database interface 146, for example, establishes (and terminates) connections (via a connection handling infrastructure) between business logic 144 and database layer 130. Business logic 144 accesses database tables (and, in some cases, a data dictionary) via database interface 146. Typically, database interface 146 controls the access of database tables using transactions. The term "transaction" refers to a series of database operations that form a unit with regard to backup and synchronization (e.g., a read transaction or a write transaction).

After database interface 146 obtains a connection, one or more connection parameters are set to values that are, in part, defined by the application that has requested the connection. The term "connection parameter" broadly refers to parameters that define the behavior of a connection such as transaction isolation level or auto-commit mode. Experience has shown that it is common to change connection parameters several times before the connection actually processes database statements. Immediate execution of changes for connection parameters incurs a noticeable cost in database performance. For example, a system latency is incurred by passing the parameter change to the database server and by subsequently waiting for the result of the change operation.

SUMMARY OF THE INVENTION

Embodiments of the invention are generally directed to a system and method for deferred database connection configuration. A database connection handle associated with a physical database connection is assigned to an application. An indication is received from the application to access a specified connection parameter of the physical database connection. A connection handling infrastructure determines whether the specified connection parameter is one of a selected subset of connection parameters. Access to the specified connection parameter is deferred, if the specified connection parameter is one of the selected subset of connection parameters.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for deferred database connection configuration. A database connection handle associated with a physical database connection is assigned to an application. An indication is received from the application to access a specified connection parameter of the physical database connection. A connection handling infrastructure determines whether the specified connection parameter is one of a selected subset of connection parameters. Access to the specified connection parameter is deferred, if the specified connection parameter is one of the selected subset of connection parameters.

Figure 1:
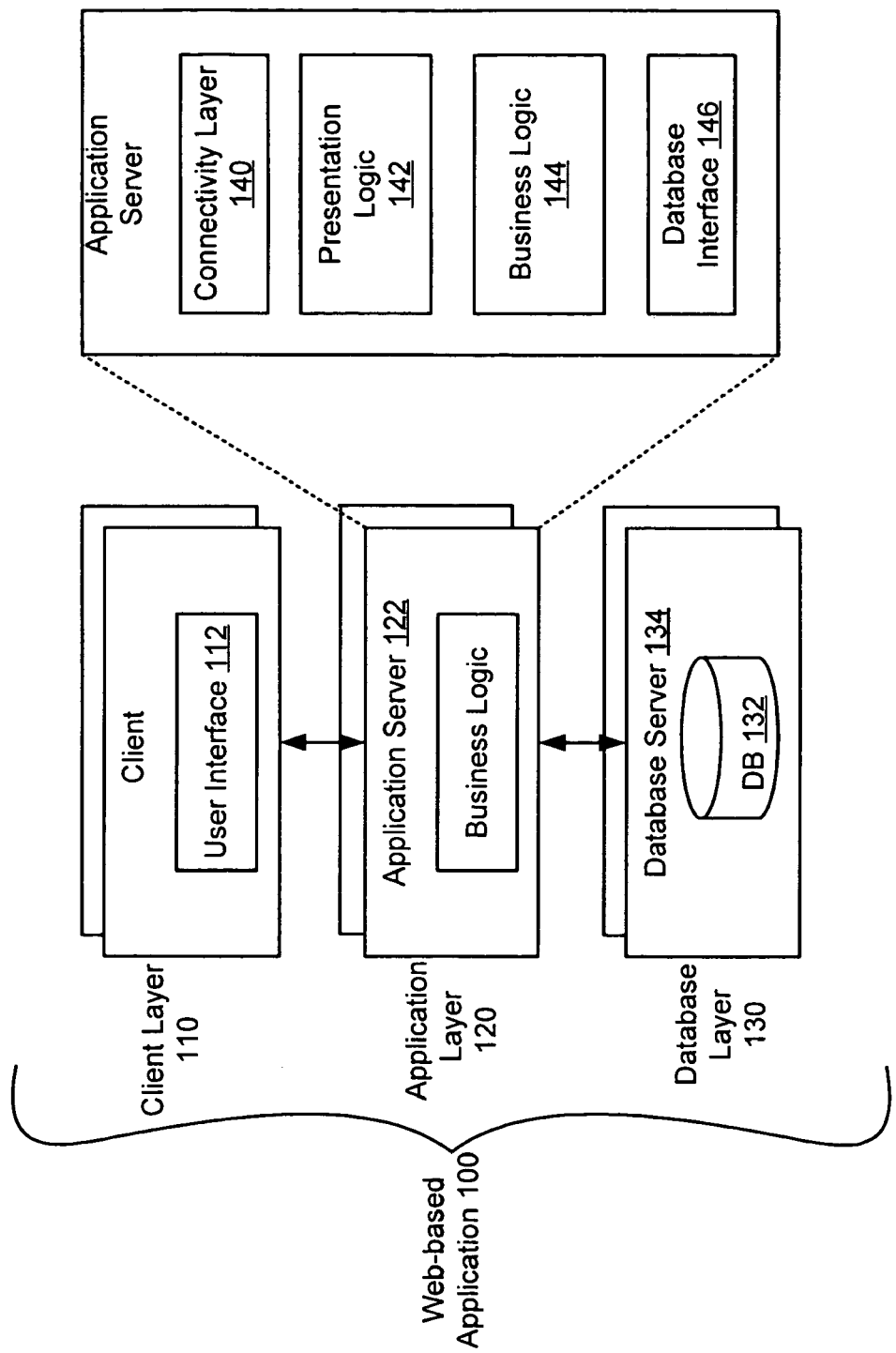
FIG. 1 is a block diagram of a Web-based application having a multi-tiered architecture.
Figure 2:
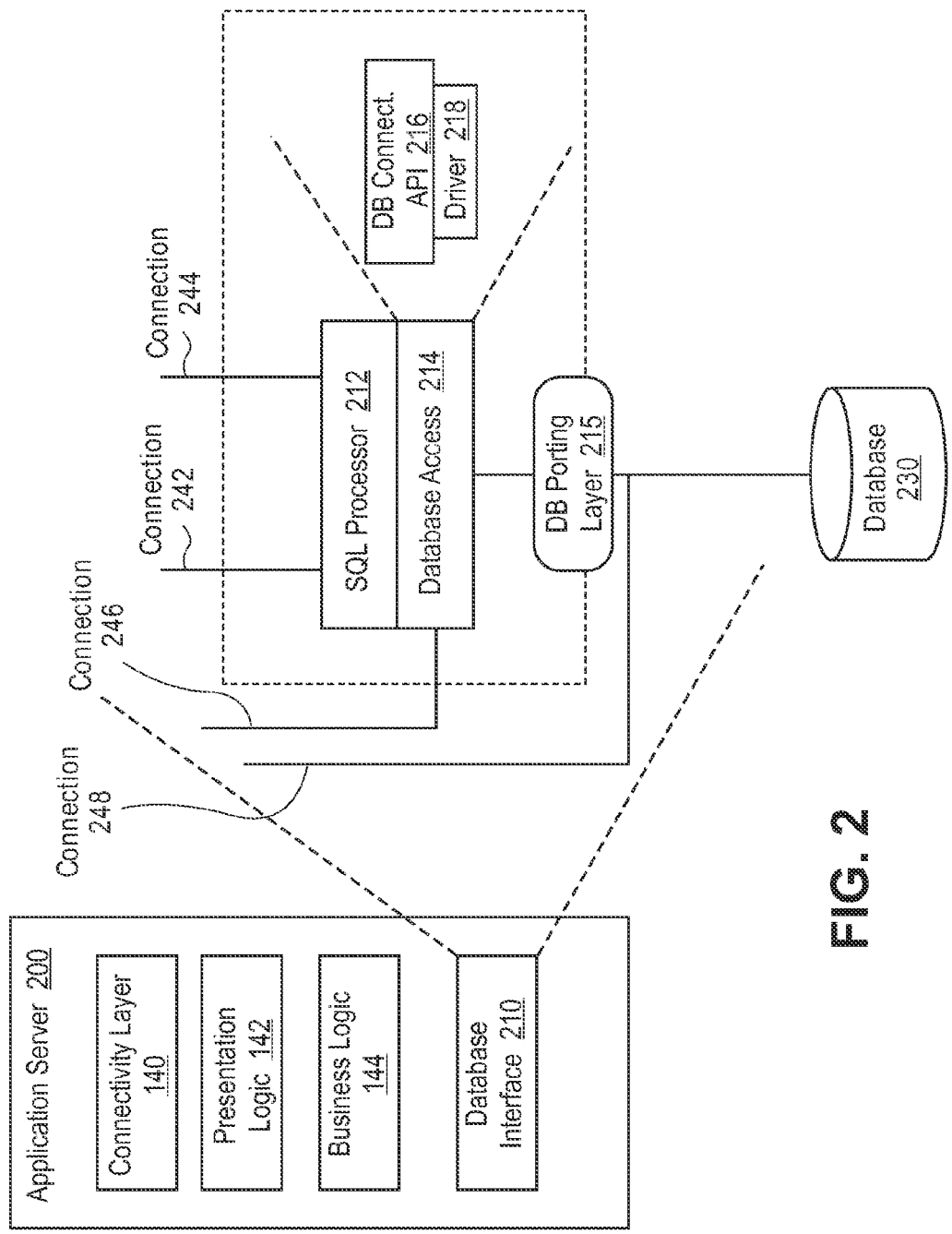
FIG. 2 is a block diagram of selected elements of an application server, implemented according to an embodiment of the invention.

FIG. 2 is a block diagram of selected elements of application server 200 implemented according to an embodiment of the invention. In an embodiment, application server 200 may be part of a multi-tiered network. The multi-tiered network may be implemented using a variety of different application technologies at each of the layers of the multi-tier architecture, including those based on the Java 2 Enterprise Edition™ ("J2EE") specification (e.g., the Websphere platform developed by IBM Corporation), the Microsoft .NET platform, and/or the Advanced Business Application Programming ("ABAP") platform developed by SAP AG. The J2EE specification refers to any of the J2EE specifications including, for example, the Java 2 Enterprise Edition Specification v1.3, published on Jul. 27, 2001.

Application server 200 includes database interface 210. In an embodiment, database interface 210 provides a connection handling infrastructure for connections between application server 200 and database 230. For example, database interface 210 provides database connections 242, 244, 246 and 248, as needed, for applications running on application server 200. The connections are used to submit database access statements and examine the results (if any). The term "database access statement" refers to software that is used to access data stored on a database such as Structured Query Language (SQL) statements. An SQL statement broadly refers to a statement structured in accordance with any of the SQL standards, for example, statements that comply with the American National Standards Institute/International Organization or Standardization (ANSI/ISO) 9075: 1992 Information Technology—Database Languages—SQL standard (hereinafter, the SQL-92 Standard).

The applications running on application server 200 may be developed from an objected-oriented point-of-view. That is, they may consist of object that are typically accessed by identifying a first object as a starting point and finding additional objects by, for example, following references or calling methods. In contrast, database 230 is typically organized according to a completely different organizational model that is based on set-oriented query and update statements. Database interface 210 includes database connectivity Application Programming Interface (API) 216 to provide, in part, a mechanism for object-oriented applications to access relational database 230 using, for example, SQL statements. In one embodiment, database connectivity API 216 is the JDBC™ API.

JDBC API 216 defines a set of interfaces that encapsulate database functionality such as a connection interface, a query statement interface, and a result set interface. JDBC driver 218 is a set of classes that implements these interfaces for database 230. The database connections provided by database interface 210 are instances of the connection class or classes that implement the connection interface. The behavior of each database connection is, in part, defined by one or more connection parameters. Database porting layer 215 includes one or more ports to database 230. In an embodiment, database porting layer 215 is a collection of SAP specific interfaces and their database specific implementations extending JDBC API 216 for database porting purposes. As is further described below with to FIGS. 3-11, database interface 210 provides a mechanism to defer configuration of one or more connection parameters until it is desirable to propagate the configuration of the parameters to database 230.

Figure 3:
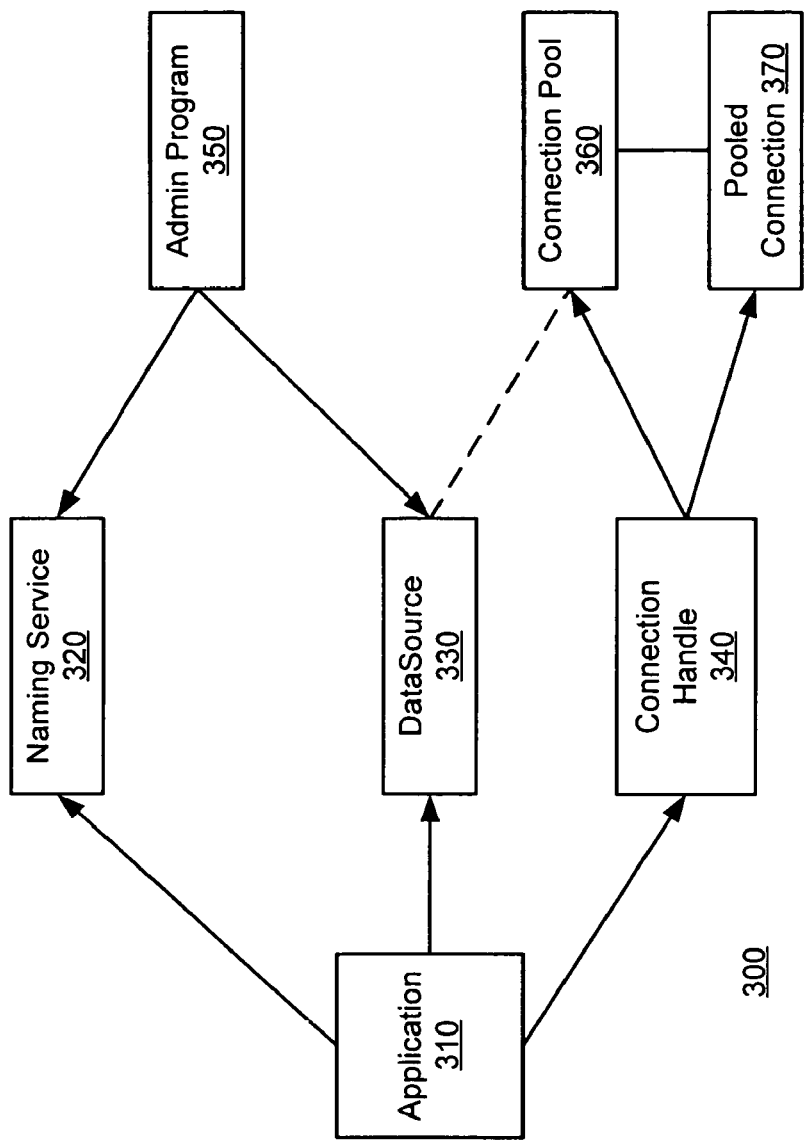
FIG. 3 is a block diagram illustrating selected aspects of a connection handling infrastructure, implemented according to an embodiment of the invention.

FIG. 3 is a block diagram illustrating selected aspects of connection handling infrastructure 300, implemented according to an embodiment of the invention. Connection handling infrastructure 300 provides (and manages) database connections for one or more applications (e.g., application 310). The illustrated embodiment of connection handling infrastructure 300 includes application 310, naming service 320, data source 330, connection handle 340, connection pool 360, and pooled connection 370. In an alternative embodiment, connection handling infrastructure 300 includes more elements, fewer elements, and/or different elements. As is further described below, connection handling infrastructure 300 provides a system and method for deferred database connection configuration.

Administration program 350 provides a mechanism to set up data source 330 and register it with naming service 320. In one embodiment, an application server (e.g. application server 200, shown in FIG. 2) provides application program 350. Alternatively, application program 350 may be a stand alone program that creates data source 330, sets one or more properties of data source 330 (e.g., name, description, etc.), and registers it with naming service 320.

Data source 330 is a software object that represents an underlying physical data source (e.g., database 230, shown in FIG. 2) and is a factory for connections to the underlying physical data source. In one embodiment, data source 330 is an instance of a class that implements an interface such as the DataSource interface of the javax.sql package of the JDBC API. In an alternative embodiment, data source 330 may implement a different interface and/or may be an instance of software from a different package.

Naming service 320 provides a mapping of logical names to data sources. In one embodiment, naming service 320 is a service that works with the Java Naming and Directory Interface (JNDI) API. The JNDI API refers to any of the JNDI APIs including, for example, the JNDI API described in the JNDI 1.2 Specification released on Jul. 14, 1999. In an alternative embodiment, naming service 320 works with a different naming interface.

The illustrated embodiment of connection handling infrastructure 300 provides pooled connections to the underlying database. The term "pooled connections" refers to a number of previously established (e.g., during startup) database connections that are maintained in a pool and shared among several users. Pooled connections reduce the expense (in terms of resources such as memory and latency) of creating a new database connection for each access to the database. In addition, pooled connections allow for a more efficient use of database connections because they enable a single connection to be shared among two or more users. In an alternative embodiment, connection handling infrastructure 300 supports standard connection objects and/or connection objects that support distributed transactions.

Connection pool 360 provides a factory for pooled connections (e.g., pooled connection 370). In an embodiment, connection pool 360 returns a pooled connection when application 310 requests a connection from data source 330. In one embodiment, connection pool 360 is an instance of a class that implements a connection pool interface such as the ConnectionPoolDataSource interface available in the javax.sql package. In an alternative embodiment, connection pool 360 may implement a different interface and/or may be an instance of software from a different package.

Pooled connection 370 is a connection (e.g., session) to an underlying data source (e.g., database 230 shown in FIG. 2). Application 310 uses methods in connection handle 340 representing pooled connection 370 to specify transaction attributes, to send queries to an underlying data source, and to access the results of the queries. In an embodiment, pooled connection 370 is an instance of a class that implements an interface such as the PooledConnection interface of the javax.sql package. In such an embodiment, connection handle 340 representing pooled connection 370 is an object that may be used to create derived objects such as Statement objects and/or PreparedStatement objects. In an alternative embodiment, pooled connection 370 may implement a different interface and/or may be an instance of software from a different package.

Connection handle 340 is a logical connection object that represents pooled connection 370. In one embodiment, when application 310 requests a database connection (e.g., with a getConnection method), the application server assigns pooled connection 370 to the application and provides connection handle 340 to interface between application 310 and pooled connection 370. When application 310 is finished using the connection, it closes connection handle 340 (e.g., via a close method) and pooled connection 370 is returned to the connection pool (e.g., connection pool 360). In one embodiment, connection handle 340 and pooled connection 370 maintain one or more internal variables representing various aspects of the database connection. The term "internal variable" refers to a structure that holds data that is assigned to it until a new value is assigned or the program finishes. Connection handles are further discussed below with reference to FIGS. 4-11.

Figure 4:
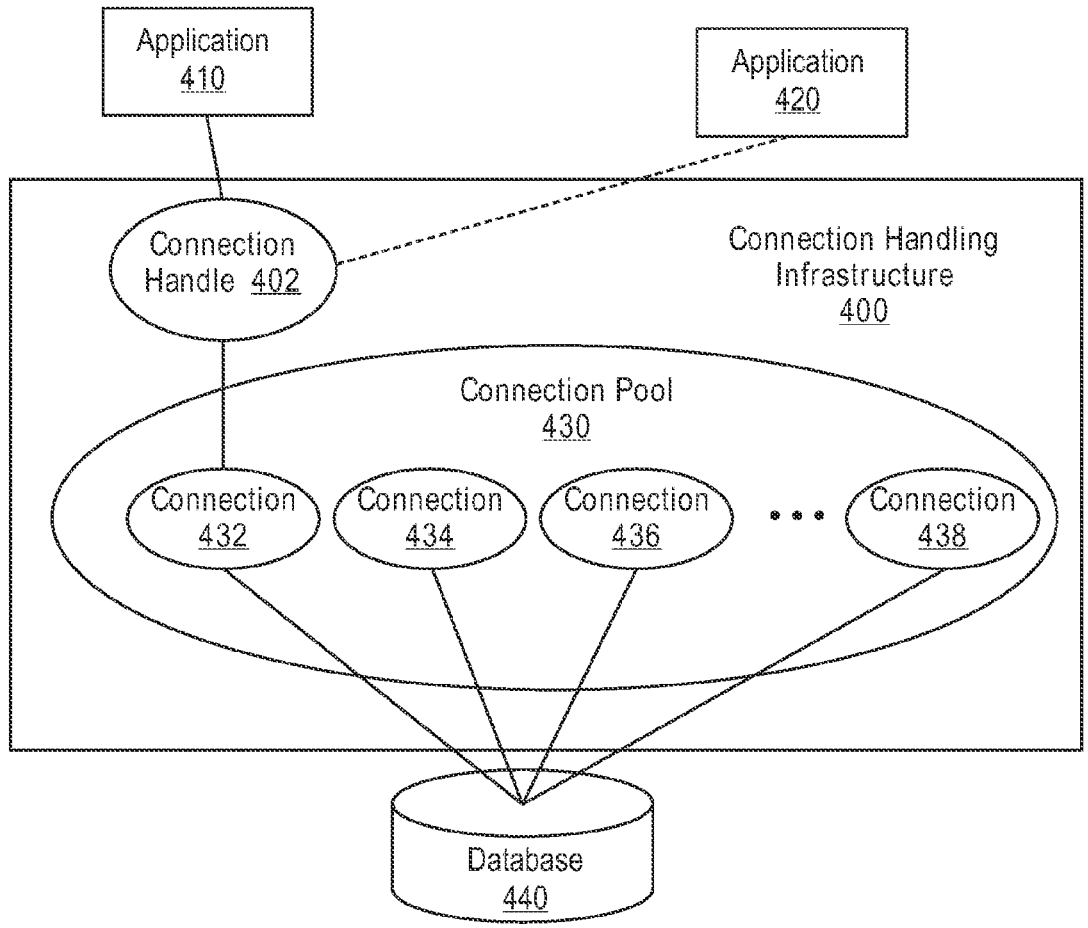
FIG. 4 is a block diagram illustrating selected aspects of a database connection handling infrastructure, implemented according to an embodiment of the invention.

FIG. 4 is a block diagram illustrating selected aspects of database connection handling infrastructure 400 implemented according to an embodiment of the invention. Database connection handling infrastructure 400 includes connection pool 430, pooled connections 432-438, and connection handle 402. Each pooled connection (e.g., pooled connections 432-438) represents a physical database connection. The behavior of a physical database connection is determined, at least in part, by the settings of one or more configuration parameters. Changing the setting of a configuration parameter is associated with a latency incurred by passing the parameter change to the database server and then waiting for the result of the change operation. In an embodiment, connection handling infrastructure 400 provides deferred configuration of one or more configuration parameters.

In an embodiment, deferring the configuration of a database parameter includes maintaining both actual state information for a connection parameter and desired state information for the connection parameter. During startup of physical pooled connection 432, the actual state information is obtained once from the database server and stored, for example, in an internal variable of pooled connection 432. During creation of connection handle 402, representing pooled connection 432, the actual state information is copied from pooled connection 432 to an internal variable of connection handle 402. The desired state information is obtained from calls sent by the application to which handle 402 is assigned (e.g., application 410) that are directed to changing connection parameter configuration.

In an embodiment, deferring the configuration of a database parameter also includes distinguishing between intervals of time when actual and desired connection parameter state information should be synchronized from those intervals of time when they need not be synchronized. One example of an interval of time when they need not be synchronized is, generally, between the end of one transaction and the start of another transaction.

For example, initially, connection handle 402 is assigned to application 410. Application 410 uses connection handle 402 to accesses database 440 within the context of a transaction. In an embodiment, connection handle 402 includes an internal variable to represent the current transaction state. When the transaction is complete, it is terminated with a COMMIT or ROLLBACK command and the current transaction state is set to inactive. In one embodiment, during the interval of time starting when the current transaction state is set to inactive and continuing until the next database access statement is sent to database 440, connection handle 402 does not propagate the connection parameter changes to the database server. Instead, for at least a selected subset of connection parameters, connection handle 402 defers requests to change parameter values and stores desired connection parameter state information in one or more internal variables. Thus, when connection handle 402 is assigned to application 420, a number of calls to change connection parameter values may be issued (e.g., from application 420 and/or the application server on which application 420 is running). Until a specified event occurs, however, connection handle 402 may defer configuring one or more connection parameters.

Figure 5:
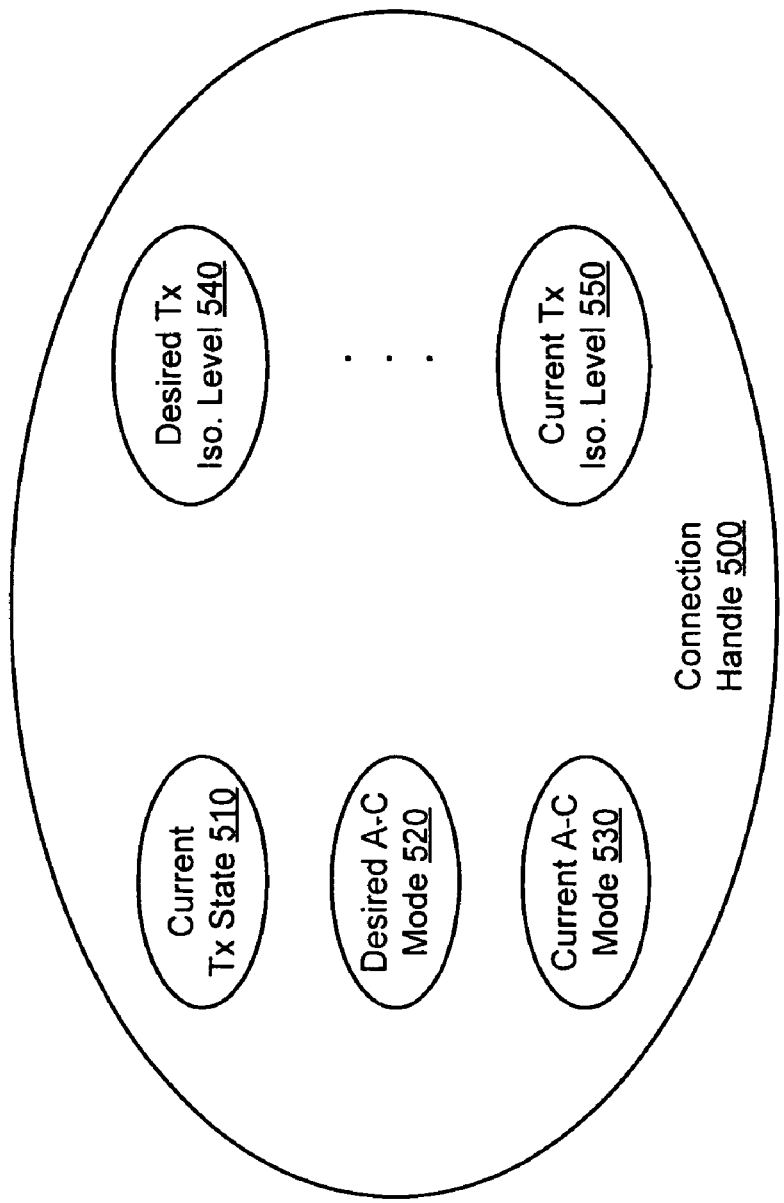
FIG. 5 is a block diagram illustrating a connection handle, implemented according to an embodiment of the invention.

FIG. 5 illustrates connection handle 500, implemented according to an embodiment of the invention. Connection handle 500 includes internal variables to represent a current transaction state, a desired connection parameter state, and a corresponding current connection parameter state. Internal variable 510, for example, represents a current transaction state and is further discussed below with reference to FIG. 6.

Connection handle 500 maintains both desired state information and current state information for a selected subset of connection parameters. In an embodiment, the selected subset of connection parameters includes the transaction isolation level and the auto-commit mode. The auto-commit mode refers to a transaction mode in which a commit command is automatically sent after each database operation (e.g., read and/or write operation). Typically, the value of the auto-commit mode for a transaction is either true or false depending on whether the auto-commit mode is on or off. Internal variable 520 represents a desired value for the auto-commit mode as indicated by an application. Internal variable 530 represents a current value of the auto-commit mode.

Transaction isolation levels determine the extent to which the operation of one transaction can affect the operation of another transaction. The American National Standards Institute (ANSI) defines four isolation levels in the ANSI X3.135-1992 standard entitled, "American National Standard for Information Systems—Database Language—SQL, November 1992" (SQL-92 standard). The four isolation levels defined by the SQL-92 standard are: uncommitted read, committed read, repeatable read, and serializable. Internal variable 540 represents a desired value for the transaction isolation level as indicated by an application. Internal variable 550 represents a current value of the transaction isolation level as determined by the database server.

Figure 6:
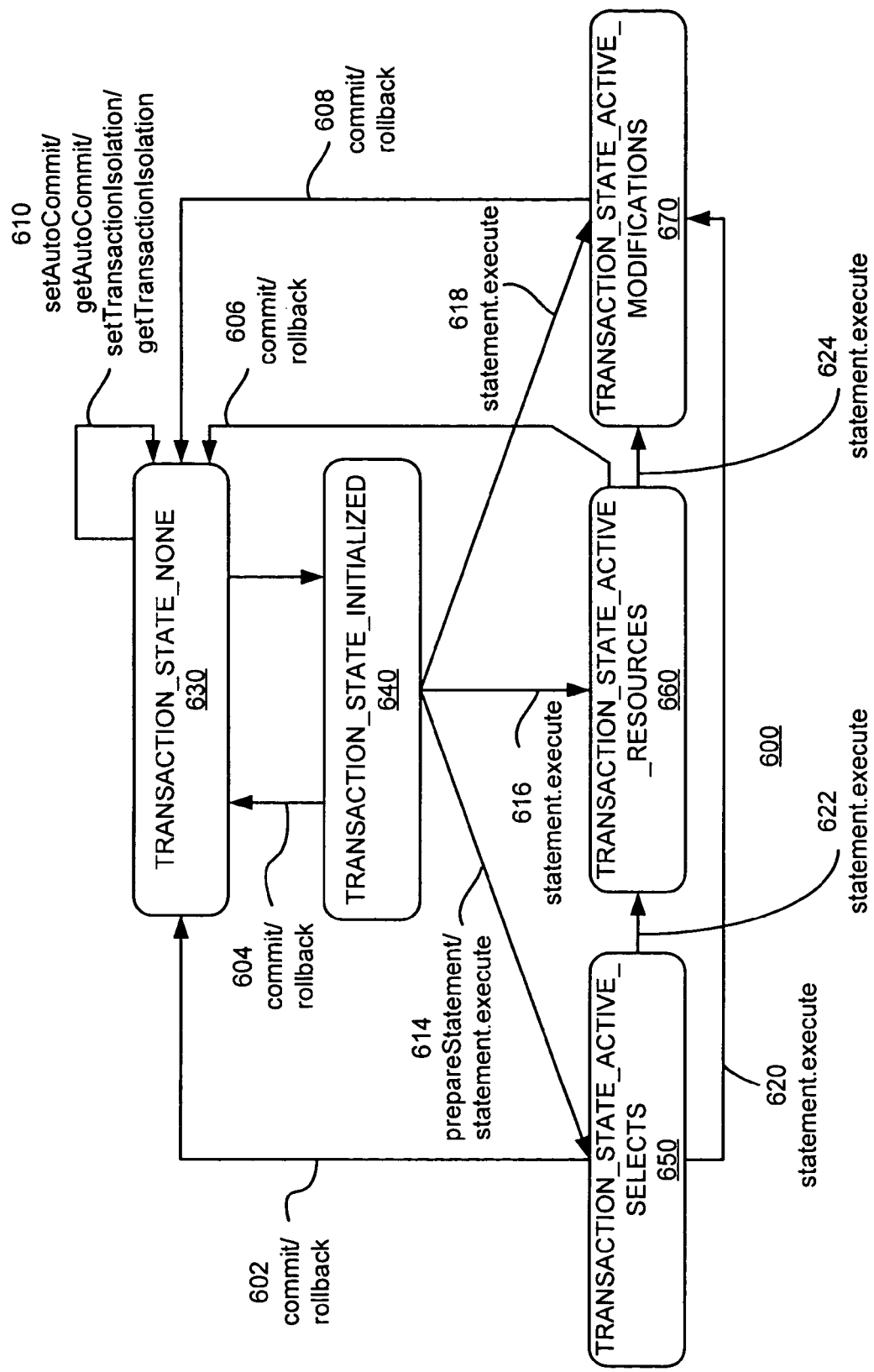
FIG. 6 is a state diagram illustrating selected aspects of an internal variable representing the current transaction state of a connection handle, according to an embodiment of the invention.

FIG. 6 is a state diagram illustrating selected aspects of an internal variable 600 representing the current transaction state of a connection handle, according to an embodiment of the invention. After a database transaction has been terminated via a COMMIT or ROLLBACK command, the transaction state is set to TRANSACTION_STATE_NONE 630 (as shown by 602-608) to indicate that no database transaction is currently active. The associated connection handle receives calls to configure various connection parameters of the database connection. The source of these calls may be, for example, an application that is part of the business layer of an application server and/or an application that is associated with a service provided the application server (e.g., a JDBC connection service). In an embodiment, as long as there are only calls to a selected subset of connection parameters, the transaction state does not change but the desired state values (as indicated by the method call) are internally noted (e.g., in one or more of internal variables 520-550, shown in FIG. 5).

In one embodiment, the selected subset of connection parameters includes the auto-commit mode and the transaction isolation level. In such an embodiment, if the transaction state is an inactive transaction state (e.g., TRANSACTION_STATE_NONE 630), method calls to set/get the auto-commit mode and method calls to set/get the transaction isolation level are deferred as shown by 610. In an alternative embodiment, the selected subset of connection parameters includes more connection parameters, fewer connection parameters, and/or different connection parameters. For example, in one embodiment, the selected subset of connection parameters includes an SQL warning connection parameter. The SQL warning connection parameter refers to a subclass of an SQL exception in which the warnings must be explicitly retrieved. An SQL warning is often used when something not quite right has happened during the execution of an SQL statement but it is not significant enough to end processing.

In an embodiment, the execution of any method other than the ones to set/get the auto-commit mode and to set/get the transaction isolation level, triggers an alignment of the desired state variables and their corresponding current state variables. In one embodiment, the connection handling infrastructure compares the values of the desired state variables with the values of the current state variables. If the values are not aligned (e.g., not equal), then the connection handling infrastructure calls one or more set methods to synchronize the values.

In the illustrated embodiment, the current auto-commit mode state and the current transaction isolation level of the underlying physical database connection (e.g., JDBC connection) are compared to the corresponding desired values. The current values are aligned via deferred execution of setAutoCommit and/or setTransactionIsolation thereby synchronizing the actual state information in the corresponding pooled connection, if necessary. The transaction state is then set to an initialized state (e.g., TRANSACTION_STATE_INITIALIZED 640). In an embodiment, the transaction state is set to TRANSACTION_STATE_INITIALIZED 640 when the configuration of transactional behavior is complete and the connection handle is ready for a database transaction to be started.

In an embodiment, after the transaction has been initialized, every call to the methods of the connection handle that are directed to obtaining, modifying, and/or providing data from the database, triggers adjustment of the transaction state. For example, every call to a prepareStatement method or the execute methods of statement objects derived from the connection, triggers adjustment of the transaction state. In one embodiment, these methods receive a tree representation of the current statement (e.g., current SQL statement) as a parameter. The tree representation of the statement provides easier identification of the statement type because the clauses of the statement (e.g., SELECT clause, WHERE clause, etc.) are represented by nodes of the tree representation. In one embodiment, the following statement types are possible: INSERT, UPDATE, DELETE, SELECT_FOR_UPDATE, and SELECT.

In one embodiment, the choice of which transaction state to transition to is based, at least in part, on the statement type. For example, if the statement is a SELECT statement, the underlying database porting layer determines whether a SELECT statement, under the current transaction isolation level, causes the database to allocate any resources. The term "resources" refers to, for example, database locks such as exclusive locks, non-exclusive locks, etc. In one embodiment, if the SELECT statement does not cause the database to allocate resources, then the transaction state transitions to a first state (e.g., TRANSACTION_STATE_ACTIVE_SELECTS 650) as shown by 614. In an embodiment, the first state indicates that a database transaction is active and that database resources are not allocated for the transaction.

If, however, the SELECT statement does cause the database to allocate resources, then the transaction state transitions to a second state (e.g., TRANSACTION_STATE_ACTIVE_RESOURCES 660) as shown by 616. If the statement is a SELECT_FOR_UPDATE statement, then the transaction state also transitions to the second state (e.g., TRANSACTION_STATE_ACTIVE_RESOURCES 660). In an embodiment, the second state indicates that a database transaction is active and that database resources are allocated for the transaction.

In an embodiment, if the statement is one of an INSERT statement, an UPDATE statement, and a DELETE statement, then the transaction state transitions to a third state (e.g., TRANSACTION_STATE_ACTIVE_MODIFICATION 670) as shown by 618. The third state indicates that a database transaction is active and data on the database is to be modified. In one embodiment, until the transaction is terminated, the transaction state can only be raised (e.g., from the first state to the second state to the third state) as shown by 620-624.

The execution of one or more connection handle methods is based, at least in part, on whether the connection handle is in the first, second, or third state, when the method is called. In one embodiment, the relevant connection handle methods are the methods directed to terminating a transaction such as commit, rollback, setAutoCommit, and close. In such an embodiment, the cost in latency and system resources of propagating a command to the database can, in some cases, be reduced by selecting an appropriate command based, partly, on the current transaction state (e.g., first, second, or third state).

In one embodiment, the most significant benefits are available when a transaction is terminated while the transaction state is the first state (e.g., TRANSACTION_STATE_ACTIVE_SELECTS 650). The reason for this is that the first state corresponds to a transaction for which the database does not allocate resources. Thus, the connection handling infrastructure need not explicitly release resources allocated on the database. In an embodiment, if the transaction state is the first state, explicit calls to the commit and rollback methods and implicit calls to the commit and rollback methods within the setAutoCommit and close methods are not propagated to the database.

In an embodiment, efficiencies are also possible when a transaction is terminated while the transaction state is the second state (e.g., TRANSACTION_STATE_ACTIVE_RESOURCES 660). Experience has shown that a COMMIT command provides better performance (e.g., less latency and/or fewer system resources used) than a ROLLBACK command. Since, the second state corresponds to a transaction for which database resources are allocated but data is not modified on the database, the connection handling infrastructure is free to release resources without regard for the consistency benefits provided by a ROLLBACK operation. Both a COMMIT command and a ROLLBACK command will release resources allocated on a database. In an embodiment, if a rollback method is called when the transaction state is the second state, a COMMIT command is propagated to the database.

Figure 7:
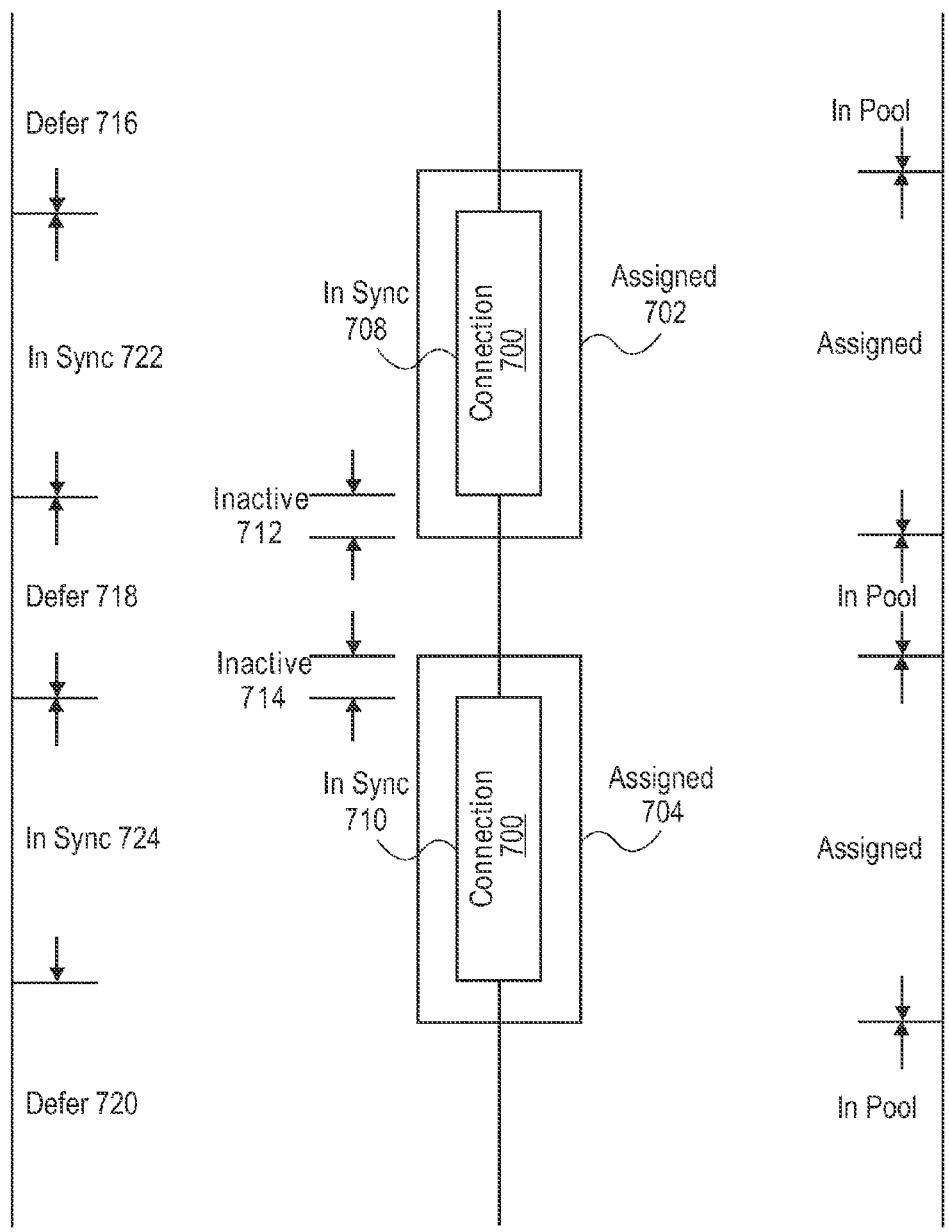
FIG. 7 is a conceptual illustration of intervals of time when desired state values and current state values are and, alternatively, are not synchronized.

FIG. 7 is a conceptual illustration of intervals of time when desired state values and current state values are and are not synchronized. Typically, a connection cycles through a similar sequence of events multiple times during its lifetime. That is, during some intervals of time the connection is in a connection pool and during other intervals of time it is assigned to an application. In addition, during some fraction of the time that the connection is assigned to an application, it is also engaged in an active database transaction. For example, the regions shown by 702 and 704 illustrate when connection 700 is assigned to an application. Similarly, the regions shown by 708 and 710 illustrate intervals of time when connection 700 is engaged in active database transactions. Regions 712 and 714 illustrate intervals of time when connection 700 has been assigned, the connection parameters are being configured, and a transaction has not yet been started. Thus, intervals 708 and 710 correspond to the first, second and third transaction state of a connection handle. Similarly, intervals 712 and 714 correspond to an inactive transaction state (e.g., TRANSACTION_STATE_NONE 630, shown in FIG. 6).

In an embodiment, connection parameter changes for a selected subset of connection parameters are deferred during intervals of time when there is no active transaction as shown by 716-720. The desired values for the connection parameters are internally stored, for example, until intervals 708-710. In one embodiment, desired state values are synchronized with current state values during intervals 708-710 as shown by 722-724.

Turning now to FIGS. 8-11, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 8:
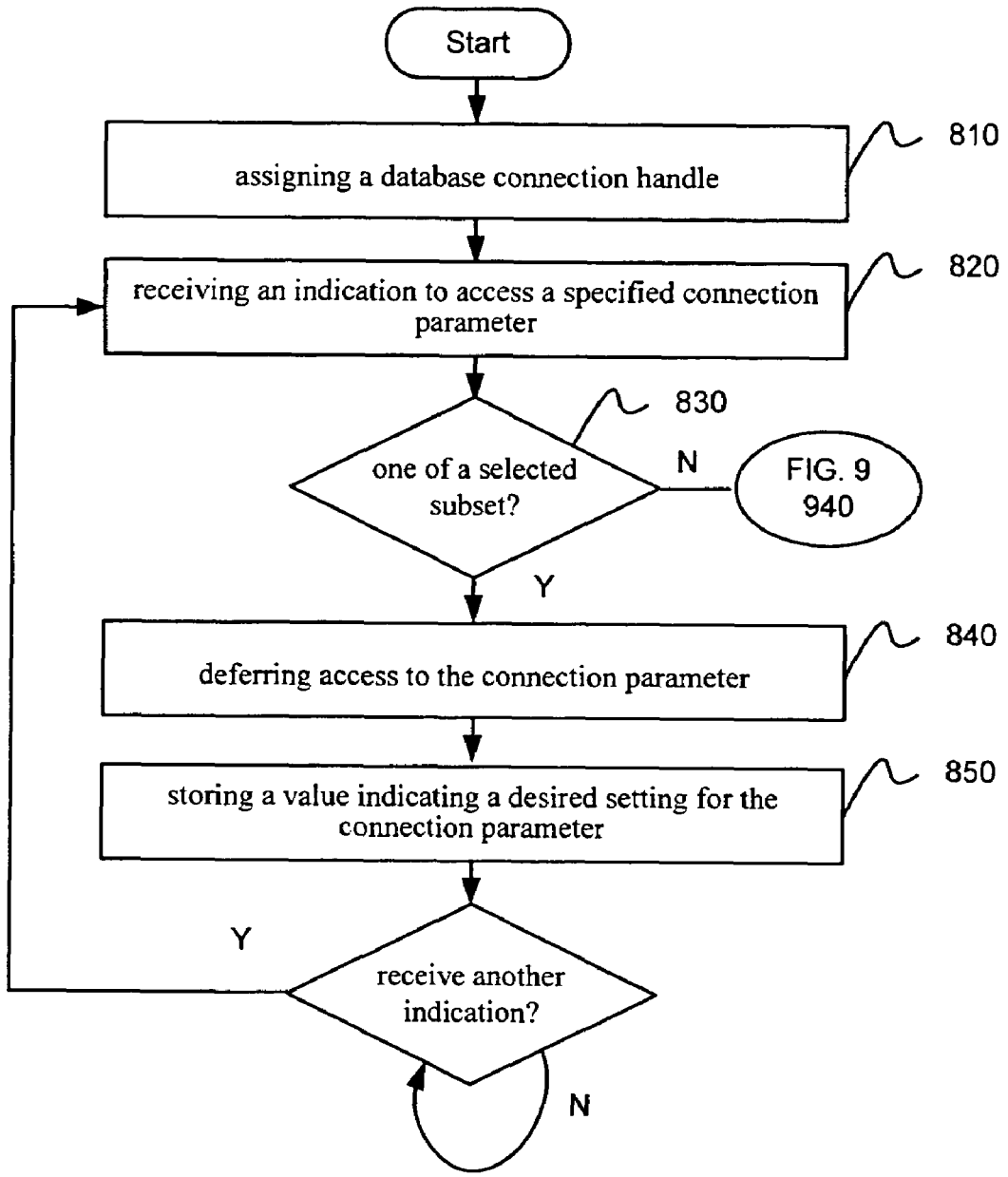
FIG. 8 is a flow diagram illustrating certain aspects of a method for deferring database connection configuration, according to an embodiment of the invention.

FIG. 8 is a flow diagram illustrating certain aspects of a method for deferring database connection configuration, according to an embodiment of the invention. Referring to process block 810, a connection handling infrastructure (e.g., infrastructure 400, shown in FIG. 4) assigns a database connection handle to an application. The database connection handle is associated with a physical database connection (e.g., connections 432-438, shown in FIG. 4). In an embodiment, the physical database connection may be a standard connection, a pooled connection, a distributed transaction connection, etc. The physical database connection includes one or more connection parameters. The connection parameters include settings that have values that are configured by methods of the connection.

Referring to process block 820, the connection handling infrastructure receives an indication from the application to access a specified connection parameter. In one embodiment, "receiving an indication" includes being called by a method that passes a value for a connection parameter. The term "access" includes setting a value and/or getting a value. Examples of such methods include, and are not limited to, set/get auto-commit mode and set/get transaction isolation level.

Referring to process block 830, the connection handling infrastructure determines whether the specified connection parameter is one of a selected subset of connection parameters. In an embodiment, the connection handling infrastructure compares the specified connection parameter with the members of the selected subset to determine whether it is one of the selected subset of connection parameters. In one embodiment, the selected subset of connection parameters includes the auto-commit mode and the transaction isolation level. In an alternative embodiment, the selected subset of connection parameters includes more connection parameters, fewer connection parameters, and/or different connection parameters.

Referring to process block 840, the connection handling infrastructure defers access to the specified connection parameter, if it is one of the selected subset of connection parameters. The term "defer access" refers to deferring execution of an instruction to configure the connection parameters. For example, deferring access may include deferring execution of a get/set auto-commit mode method and/or a get/set transaction isolation level method.

Referring to process block 850, the connection handling infrastructure stores a value indicating a desired setting for the specified connection parameter. In one embodiment, the stored value is obtained from the method call that attempted to access the connection parameter. Thus, if a setAutoCommit to true method is called, a value indicating true (e.g., 1) is stored. Similarly, if setTransactionIsolation method is called, a value indicating the desired transaction isolation level (e.g., 0, 1, 2, 4, 8) is called. In an embodiment, the values indicating the desired setting for the specified connection parameter are stored in one or more internal variables of the connection handle (e.g., internal variables 520-550, shown in FIG. 5).

Figure 9:
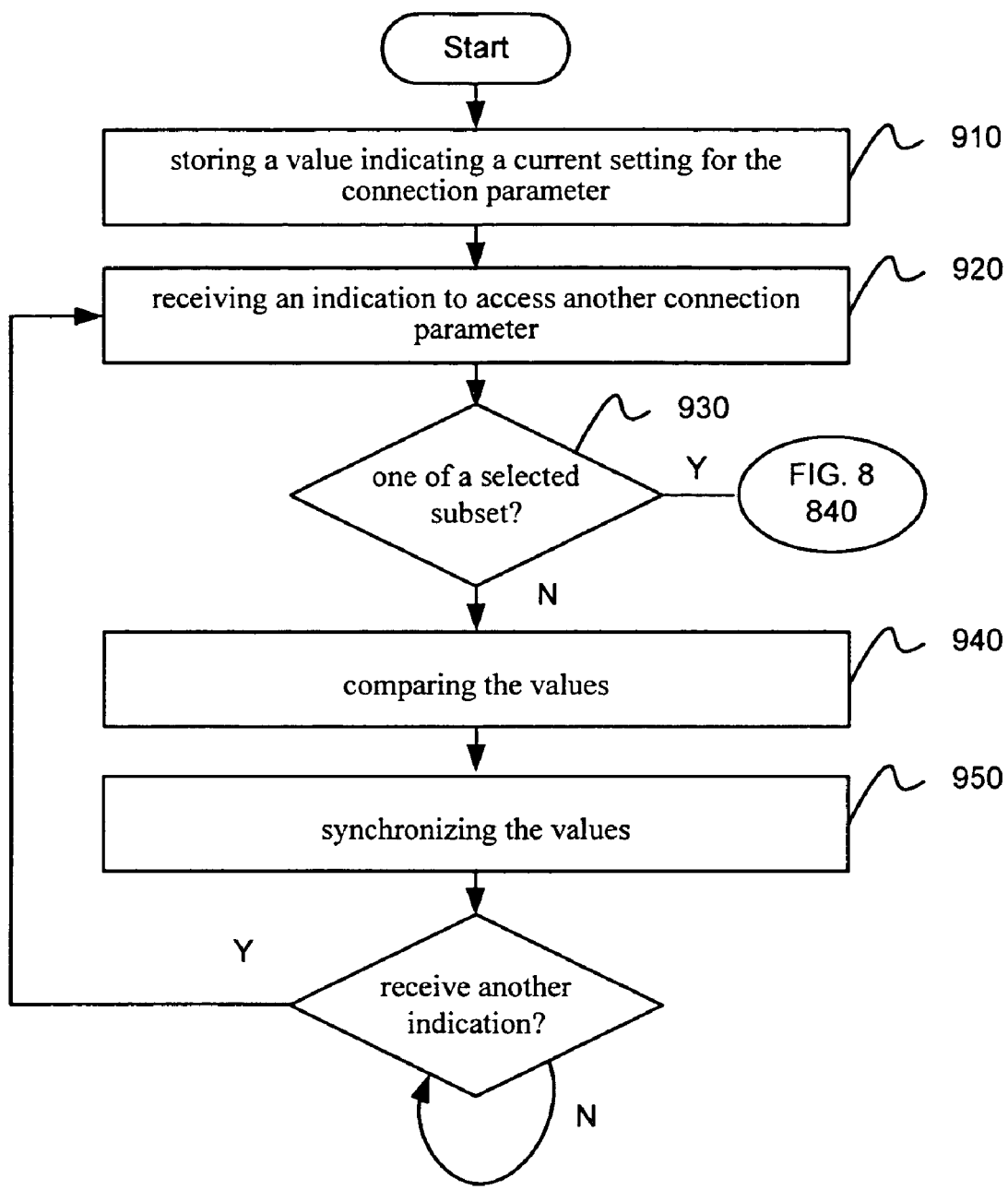
FIG. 9 is a flow diagram illustrating certain aspects of a method for deferring database connection configuration, according to an embodiment of the invention.

FIG. 9 is a flow diagram illustrating certain aspects of a method for deferring database connection configuration, according to an embodiment of the invention. Referring to process block 910, the connection handling infrastructure stores a value indicating a current setting for the specified connection parameter. In one embodiment, the value indicating the current setting is stored in an internal variable of the connection handle. For example, a value indicating a current setting of the auto-commit mode and a value indicating a current setting of the transaction isolation level may be stored in internal variables (e.g., internal variables 520-550) of the connection handle associated with the connection.

Referring to process block 920, the connection handling infrastructure receives an indication to access another connection parameter. The received indication may be an instruction, a method call, and the like. The connection handling infrastructure determines whether the received indication is directed to one of the selected subset of connection parameters at 930. If it is not, the connection handling infrastructure compares the value indicating the desired state of the connection parameter with the value indicating the current state of the connection parameter at 940. If the values are not aligned, the connection handling infrastructure synchronizes the values at 950. Synchronizing the values refer to, for example, executing a method (e.g., a set auto-commit method and/or a set transaction isolation level method) to set the current value of the connection parameter so that it is aligned (e.g., equal) to the desired value.

Figure 10:
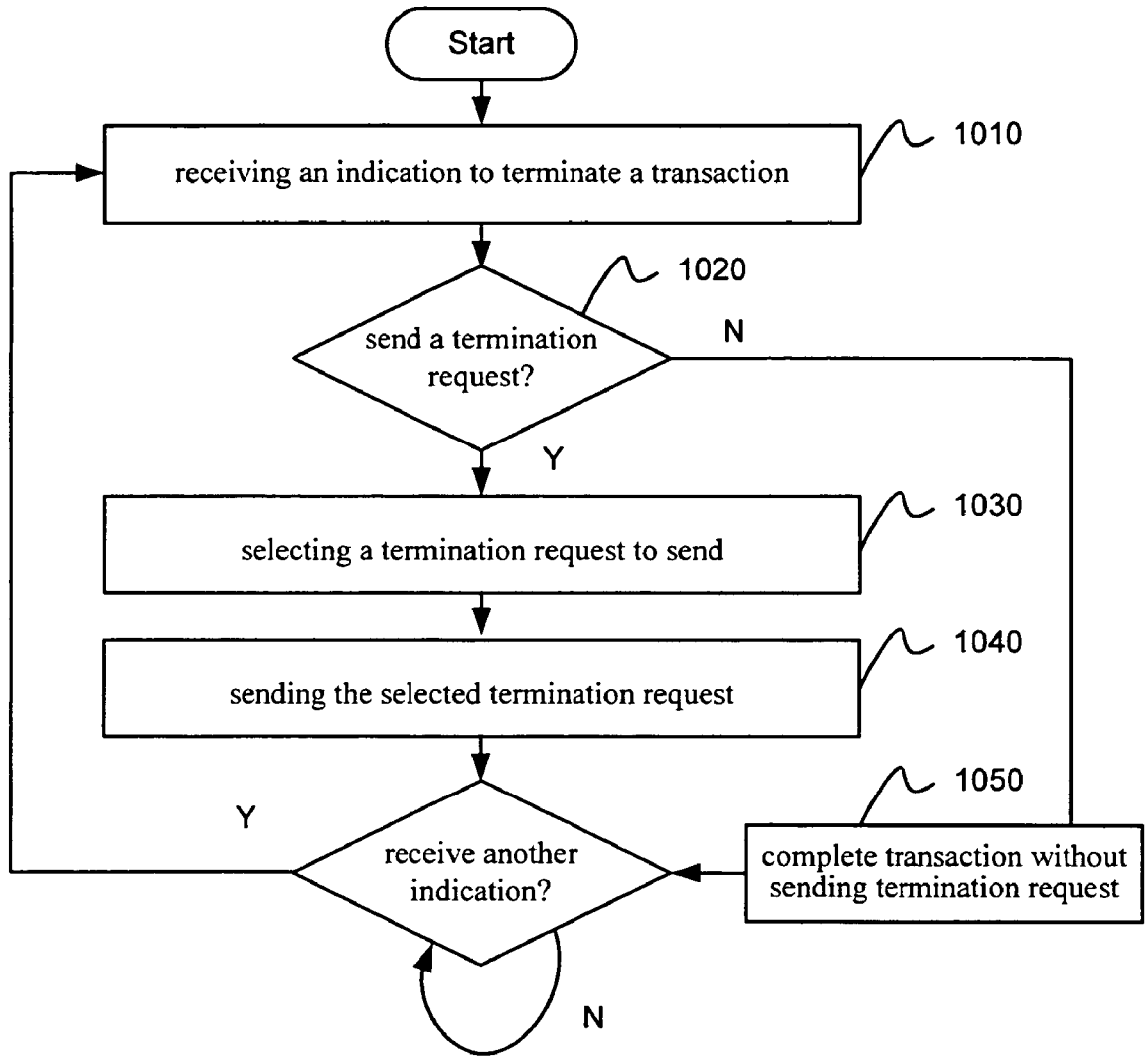
FIG. 10 is a flow diagram illustrating certain aspects of a method for optimizing database transaction termination, according to an embodiment of the invention.

FIG. 10 is a flow diagram illustrating certain aspects of a method for optimizing database transaction termination, according to an embodiment of the invention. Referring to process block 1010, the connection handling infrastructure receives an indication to terminate a transaction. The phrase "receives an indication to terminate a transaction" broadly refers to receiving an instruction, command, method call, etc. that indicates a transaction is to be terminated. In one embodiment, "receiving an indication to terminate a transaction" includes receiving an indication that a connection handle's commit method or rollback method is called.

Referring to process block 1020, the connection handling infrastructure determines whether to send a termination request to the database. The term "termination request" broadly refers to sending a command (e.g., a COMMIT command and/or a ROLLBACK command) to the underlying database server. In an embodiment, whether a termination request is sent to the database depends, at least in part, on the current transaction state of the connection handle (e.g., see discussion above with reference to FIG. 6). In addition, whether to send a termination request may be based, at least in part, on the received indication to terminate the transaction (e.g., see discussion above with reference to FIG. 6).

Referring to process block 1030, if a termination request is to be sent, the connection handling infrastructure determines which request to send (e.g., a COMMIT command and/or a ROLLBACK command). Experience has shown that a COMMIT command is associated with less latency and the use of fewer system resources than a ROLLBACK command. In an embodiment, the connection handling infrastructure determines which termination request to send based, at least in part, on a current transaction state of the connection handle transaction (e.g., see discussion above with reference to FIG. 6). The selected termination request is sent to the database at 1040.

Figure 11:
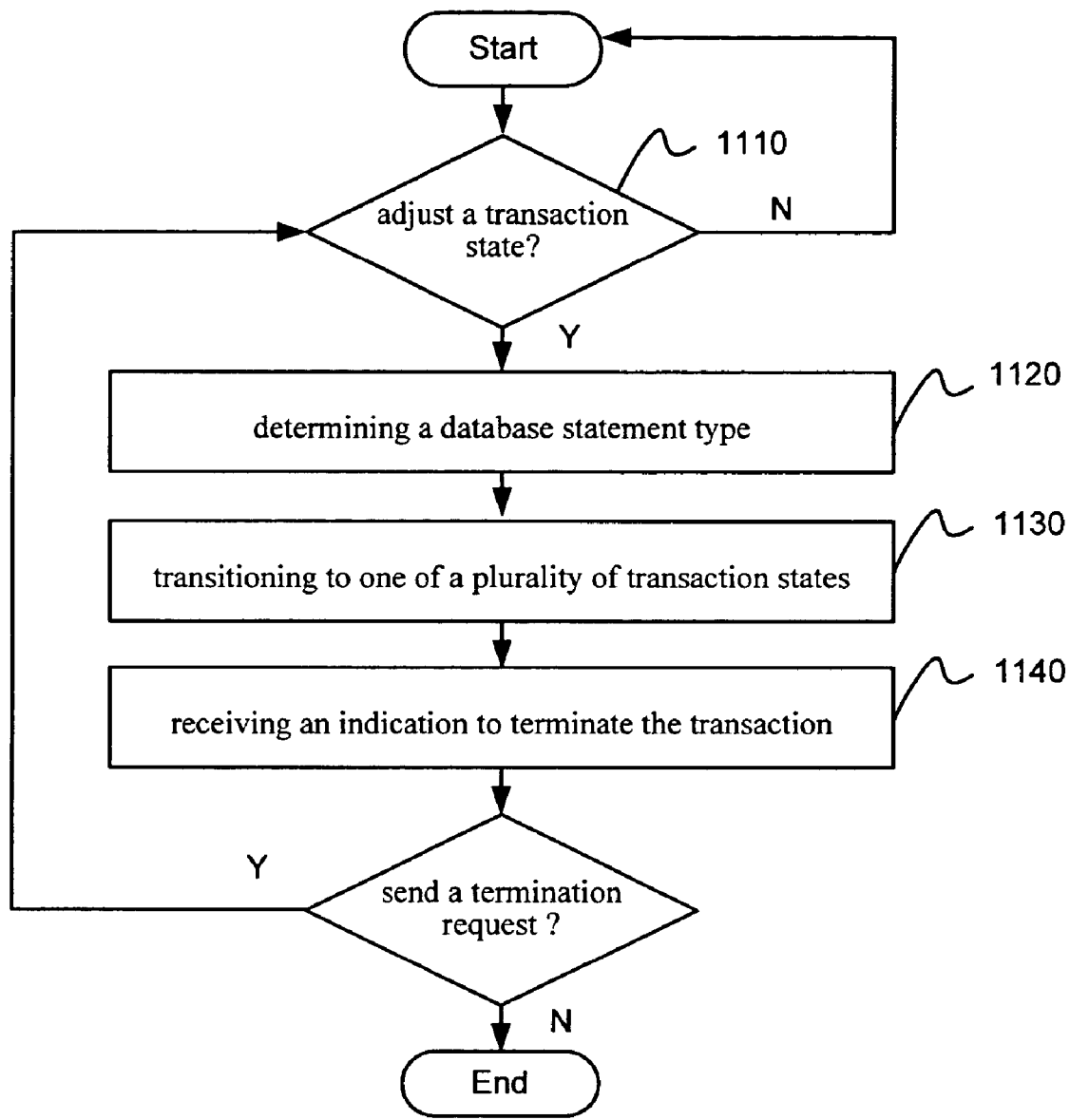
FIG. 11 is a flow diagram illustrating certain aspects of a method for optimizing database transaction termination, according to an embodiment of the invention.

FIG. 11 is a flow diagram illustrating certain aspects of a method for optimizing database transaction termination, according to an embodiment of the invention. Referring to process block 1110, the connection handling infrastructure receives an indication to adjust a transaction state of a database connection. In one embodiment, the transaction state is initially in an initialized state (e.g., TRANSACTION_STATE_INITIALIZED 640, shown in FIG. 6). In such an embodiment, "receiving an indication to adjust the transaction state," broadly refers to receiving an indication to transition from the initialized state to an active state (e.g., one of states 650-670, shown in FIG. 6). In one embodiment, "receiving an indication" includes receiving a call to a prepareStatement method of the database connection. Similarly, "receiving an indication" includes receiving a call to an execute method of a statement object derived from the database connection. In an embodiment, the received indication includes a database statement (e.g., an SQL statement).

Referring to process block 1120, the connection handling infrastructure determines a statement type for the received database statement. In one embodiment, the database statement type is one of: an INSERT statement, an UPDATE statement, a DELETE statement, a SELECT_FOR_UPDATE statement, and a SELECT statement. The received statement may be in the form of a tree structure. The connection handling infrastructure queries the received statement to determine its type. If the received statement is a SELECT statement, the connection handling infrastructure asks the database porting layer whether the SELECT statement causes the database to allocate a resource based, at least in part, on a current transaction isolation level.

Referring to process block 1130, the transaction state of the connection transitions to one of a plurality of transaction states based, at least in part on the determined database statement type. In one embodiment, the transaction state transitions to a first state (e.g., state 650, shown in FIG. 6), if the database statement is a SELECT statement that does not cause the database to allocate a resource. Similarly, the transaction state transitions to a second state (e.g., state 660, shown in FIG. 6), if the database statement is a SELECT statement that causes the database to allocate a resource or if the database statement is a SELECT_FOR_UPDATE statement. In an embodiment, the transaction state transitions to a third state (e.g., state 670, shown in FIG. 6) if the statement type is an INSERT statement, an UPDATE statement, and/or a DELETE statement.

Referring to process block 1140, the connection handling infrastructure receives an indication to terminate the transaction. The received indication may be, for example, a call to the connection's commit method or a call to the connection's rollback method. In an embodiment, the received indication may be a call to the connection's close method or a call to enable an auto-commit mode of the transaction.

Referring to process block 1150, the connection handling infrastructure determines whether to send a termination request based, at least in part, on the transaction state of the database connection. In an embodiment, if the transaction state is the first state, the connection handling infrastructure does not send a termination request. If the transaction state is the second or the third state, then the connection handling infrastructure may send a termination request. In one embodiment, if a termination request is to be sent, the connection handling infrastructure further determines which termination request to send (e.g., either a COMMIT command or a ROLLBACK command). Determining which termination request to send is further discussed above with reference to FIG. 6.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   assigning to an application of an application server a database connection handle associated with a physical database connection connecting the application server to a database server, wherein the physical database connection has one or more connection parameters;
   receiving at the assigned database connection handle an indication from the application to access a connection parameter of the physical database connection;
   in response to the received indication from the application, determining that the connection parameter is one of a subset of connection parameters, wherein the subset of connection parameters is associated with a delay of the physical database connection;
   in response to the determining that the connection parameter is one of the subset of connection parameters, the assigned database connection handle deferring sending to the database server a request to access the connection parameter; and
   during the deferring sending the request to access the connection parameter, storing a value to which the connection parameter is to be set in a first variable of the database connection handle.

2. The method of claim 1, further comprising:
   storing a current value for the connection parameter in a second variable of the database connection handle.

3. The method of claim 1, further comprising:
   receiving an indication from the application to access another connection parameter other than one of the subset of connection parameters; and
   comparing the value to which the connection parameter is to be set with the current value of the connection parameter, responsive to receiving the indication from the application to access the other connection parameter; and
   modifying the current value, if the value to which the connection parameter is to be set is not aligned with the current value of the connection parameter.

4. The method of claim 3, wherein comparing the value to which the connection parameter is to be set with the current value of the connection parameter comprises one or more of:
   comparing a desired auto-commit mode state to a current auto-commit mode state; or
   comparing a desired transaction isolation level to a current transaction isolation level.

5. The method of claim 4, wherein modifying the current value, if the value to which the connection parameter is to be set is not aligned with the current value of the connection parameter comprises one or more of:
   executing a set auto-commit mode method, if the desired auto-commit mode state is not aligned to the current auto-commit mode state; or
   executing a set transaction isolation level method, if the desired transaction isolation level is not aligned to the current transaction isolation level.

6. The method of claim 5, further comprising:
   setting a transaction state of the database connection handle to an initialized state subsequent to modifying the current value of the connection parameter.

7. The method of claim 1, wherein the subset of connection parameters includes one or more of:
   an auto-commit mode state; or
   a transaction isolation level.

8. The method of claim 1, wherein receiving an indication from the application to access the connection parameter of the physical database connection comprises receiving one or more of:
   an indication that a set auto-commit mode method is called;
   an indication that a get auto-commit mode method is called;
   an indication that a set transaction isolation level method is called; or
   an indication that a get transaction isolation level method is called.

9. The method of claim 1, wherein deferring the sending of the request to access the connection parameter comprises one or more of:
   deferring execution of the set auto-commit mode method;
   deferring execution of the get auto-commit mode method;
   deferring execution of the set transaction isolation level method; or
   deferring execution of the get transaction isolation level method.

10. The method of claim 1, wherein storing the value to which the connection parameter is to be set in the first variable of the database connection handle comprises one or more of:
    storing a desired auto-commit mode state in the first variable of the database connection handle; or
    storing a desired transaction isolation level in the first variable of the database connection handle.

11. The method claim 10, further comprising storing a current value for the connection parameter in the second variable of the database connection handle, including one or more of:
    storing a current auto-commit mode state of the physical database connection in the second variable of the database connection handle; or
    storing a current transaction isolation level of the physical database connection in the second variable of the database connection handle.

12. The method of claim 1, wherein assigning the database connection handle associated with the physical database connection comprises assigning a database connection handle associated with a pooled physical database connection.

13. A system comprising:
means for assigning to an application of an application server a database connection handle associated with a physical database connection connecting the application server to a database server, wherein the physical database connection has one or more connection parameters;
means for receiving at the assigned database connection handle an indication from the application to access a connection parameter of the physical database connection;
means for determining in response to the received indication from the application that the connection parameter is one of a subset of connection parameters, wherein the subset of connection parameters is associated with a delay of the physical database connection;
means for deferring sending to the database server a request from the assigned database connection handle to access the connection parameter, the deferring in response to the means for determining that the connection parameter is one of the subset of connection parameters; and
means for storing, during the deferring sending the request to access the connection parameter, a value to which the connection parameter is to be set in a first variable of the database connection handle.

14. The system of claim 13, further comprising:
means for storing a current value for the connection parameter in a second variable of the database connection handle.

15. The system of claim 13, further comprising:
means for receiving an indication from the application to access another connection parameter other than one of the subset of connection parameters; and
means for comparing the value to which the connection parameter is to be set with the current value of the connection parameter, responsive to receiving the indication from the application to access the other connection parameter; and
means for synchronizing the value indicating the desired setting of the connection parameter with the value indicating the current setting of the connection parameter.

16. The system of claim 13, wherein the subset of connection parameters includes one or more of:
an auto-commit mode state; or
a transaction isolation level.

17. An article of manufacture comprising:
a machine-readable storage medium having stored thereon instructions that, when executed by an apparatus, cause the apparatus to
assign to an application of an application server a database connection handle associated with a physical database connection connecting the application server to a database server, wherein the physical database connection has one or more connection parameters;
receive at the assigned database connection handle an indication from the application to access a connection parameter of the physical database connection;
determine in response to the received indication from the application that the connection parameter is one of a subset of connection parameters, wherein the subset of connection parameters is associated with a delay of the physical database connection;
defer sending from the assigned database connection handle to the database server a request to access the connection parameter, the deferring in response to the determining that the connection parameter is one of the subset of connection parameters; and
store, during the deferring sending the request to access the connection parameter, a value to which the connection parameter is to be set in a first variable of the database connection handle.

18. The article of manufacture of claim 17, wherein the machine-readable storage medium has stored thereon further instructions that, when executed by the apparatus, cause the apparatus to:
store a current value for the connection parameter in a second variable of the database connection handle.

19. The article of manufacture of claim 17, wherein the machine-readable storage medium has stored thereon further instructions that, when executed by the apparatus, cause the apparatus to:
receive an indication from the application to access another connection parameter other than one of the subset of connection parameters; and
compare the value to which the connection parameter is to be set with the current value of the connection parameter, responsive to receiving the indication from the application to access the other connection parameter; and
synchronize the value to which the connection parameter is to be set with the current value of the connection parameter.

20. The article of manufacture of claim 19, wherein the instructions that, when executed by the apparatus, cause the apparatus to compare the value to which the connection parameter is to be set with the current value of the connection parameter cause the apparatus to perform one or more of:
compare a desired auto-commit mode state to a current auto-commit mode state; or
compare a desired transaction isolation level to a current transaction isolation level.

21. The article of manufacture of claim 20, wherein the instructions that, when executed by the apparatus, cause the apparatus to synchronize the value to which the connection parameter is to be set with the current value of the connection parameter cause the apparatus to perform one or more of:
execute a set auto-commit mode method, if the desired auto-commit mode state is not aligned to the current auto-commit mode state; or
execute a set transaction isolation level method, if the desired transaction isolation level is not aligned to the current transaction isolation level.

22. The article of manufacture of claim 17, wherein the subset of connection parameters includes one or more of:
an auto-commit mode state; or
a transaction isolation level.

23. The article of manufacture of claim 17, wherein the instructions that, when executed by the apparatus, cause the apparatus to receive the indication from the application to access the connection parameter of the physical database connection cause the apparatus to perform one or more of:
receive an indication that a set auto-commit mode method is called;
receive an indication that a get auto-commit mode method is called;
receive an indication that a set transaction isolation level method is called; or
receive an indication that a get transaction isolation level method is called.

24. The article of manufacture of claim 17, wherein the instructions that, when executed by the apparatus, cause the apparatus to defer access to the connection parameter cause the apparatus to perform one or more of:
- defer execution of the set auto-commit mode method;
- defer execution of the get auto-commit mode method;
- defer execution of the set transaction isolation level method; or
- defer execution of the get transaction isolation level method.

25. The article of manufacture of claim 17, wherein the instructions that, when executed by the apparatus, cause the apparatus to store the value to which the connection parameter is to be set in the first variable of the database connection handle cause the apparatus to perform one or more of:
- store a desired auto-commit mode state in the first variable of the database connection handle; or
- store a desired transaction isolation level in the first variable of the database connection handle.

26. The article of manufacture of claim 25, wherein the machine-readable storage medium has stored thereon further instructions that, when executed by the apparatus, cause the apparatus to:
- store a current value for the connection parameter in a second variable of the database connection handle, including one or more of:
    - storing a current auto-commit mode state of the physical database connection in the second variable of the database connection handle; and
    - storing a current transaction isolation level of the physical database connection in the second variable of the database connection handle.

* * * * *

UNITED STATES PATENT AND TRADEMARK OFFICE
CERTIFICATE OF CORRECTION

PATENT NO.         : 7,571,164 B2                                    Page 1 of 1
APPLICATION NO. : 10/956705
DATED              : August 4, 2009
INVENTOR(S)        : Kuersch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Seventh Day of September, 2010

David J. Kappos
*Director of the United States Patent and Trademark Office*